(12) United States Patent
Cai et al.

(10) Patent No.: US 10,755,742 B2
(45) Date of Patent: Aug. 25, 2020

(54) FRAGMENTED DATA STORAGE BANDS

(71) Applicant: Seagate Technology LLC, Cupertino, CA (US)

(72) Inventors: Jun Cai, Shugart (SG); Brian T. Edgar, Minneapolis, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/256,900

(22) Filed: Jan. 24, 2019

(65) Prior Publication Data

US 2019/0172490 A1 Jun. 6, 2019

Related U.S. Application Data

(63) Continuation-in-part of application No. 15/685,837, filed on Aug. 24, 2017, now Pat. No. 10,347,284, which is a continuation of application No. 15/017,228, filed on Feb. 5, 2016, now Pat. No. 9,767,843.

(51) Int. Cl.
*G11B 20/12* (2006.01)
*G06F 3/06* (2006.01)

(52) U.S. Cl.
CPC ......... *G11B 20/1217* (2013.01); *G06F 3/061* (2013.01); *G06F 3/0604* (2013.01); *G06F 3/064* (2013.01); *G06F 3/065* (2013.01); *G06F 3/0631* (2013.01); *G06F 3/0676* (2013.01); *G11B 2020/1238* (2013.01)

(58) Field of Classification Search
None
See application file for complete search history.

(56) References Cited

U.S. PATENT DOCUMENTS

| | | | |
|---|---|---|---|
| 9,418,688 B1* | 8/2016 | Rausch | G11B 5/3967 |
| 9,767,843 B2 | 9/2017 | Kashyap et al. | |
| 9,841,906 B2 | 12/2017 | Sokolov et al. | |
| 2014/0177085 A1* | 6/2014 | Haga | G11B 20/10527 360/48 |
| 2015/0301747 A1* | 10/2015 | Sokolov | G06F 3/0673 711/173 |
| 2017/0352376 A1 | 12/2017 | Kashyap et al. | |
| 2019/0050327 A1* | 2/2019 | Li | G06F 3/0676 |
| 2019/0102307 A1* | 4/2019 | Kowles | G06F 3/0676 |
| 2019/0278594 A1* | 9/2019 | Liu | G06F 12/0866 |

* cited by examiner

Primary Examiner — Kevin Verbrugge
(74) Attorney, Agent, or Firm — Holzer Patel Drennan

(57) ABSTRACT

An implementation of a system disclosed herein provides a method for managing data streams of sequential nature, wherein the method provides for determining that a sequence of incoming write commands are associated with an LBA range mapped to a source band and writing data of the incoming write commands to physical blocks of a destination band assigned to the LBA range of the source band such that the data of the incoming write commands is written according to a sequential order of data receipt and in a forward write direction to sequentially fill physically-consecutive blocks in the destination band.

20 Claims, 12 Drawing Sheets

FRAGMENTED DATA STORAGE BANDS

PRIORITY CLAIM

The present application is a continuation-in-part application of U.S. patent application Ser. No. 15/685,837 filed on Aug. 24, 2017, and titled "Fragmented Data Storage Bands," which is a continuation application of U.S. patent application Ser. No. 15/017,228 filed Feb. 5, 2016 and titled "Fragmented Data Storage Bands." Both of these applications are incorporated by reference for all that they disclose or teach.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

An implementation of a system disclosed herein provides a method for managing data streams of sequential nature, wherein the method provides for determining that a sequence of incoming write commands are associated with an LBA range mapped to a source band and writing data of the incoming write commands to physical blocks of a destination band assigned to the LBA range of the source band such that the data of the incoming write commands is written according to a sequential order of data receipt and in a forward write direction to sequentially fill physically-consecutive blocks in the destination band. According to one implementation, the method further provides for determining that one of the incoming write commands includes updated data corresponding to data already written to the destination band; and writing the updated data to a consecutive sequence of physical blocks in the destination band, the consecutive sequence beginning with a first unused physical block in the forward write direction of the destination band.

These and various other features and advantages will be apparent from a reading of the following detailed description.

BRIEF DESCRIPTIONS OF THE DRAWINGS

A further understanding of the various implementations described herein may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 12 illustrates example operations for closing a data band after a destination band and one or more overflow regions (e.g., write cache regions or additional destination bands) have been assigned and written to.

DETAILED DESCRIPTIONS

Figure 1:
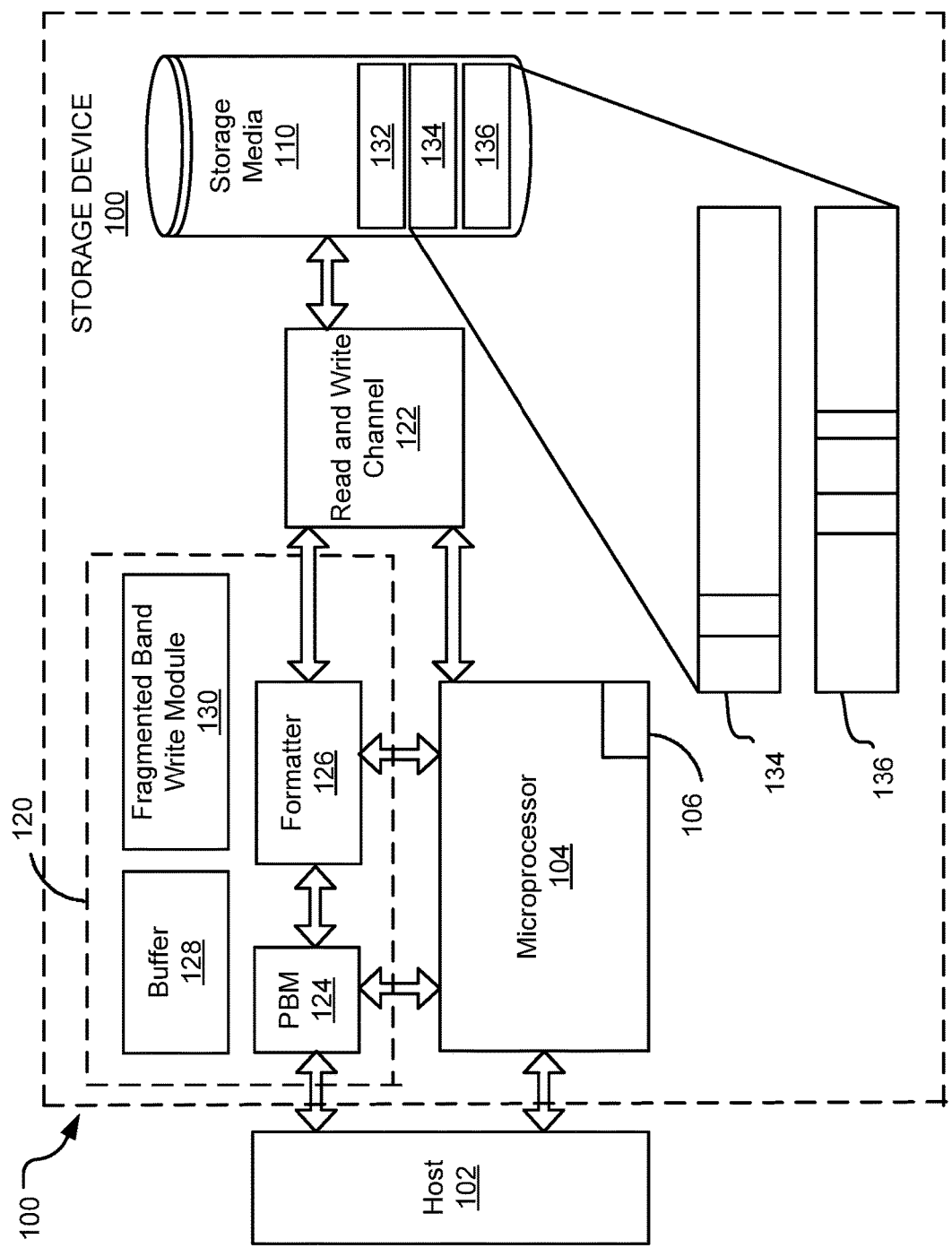
FIG. 1 illustrates example functional components of a storage device implementing fragmented data storage bands.

Disc drives are data storage devices that store digital data in magnetic form on a rotating storage medium called a disc. Each surface of a disc may be divided into several hundred thousand tracks arranged in tightly-packed concentric circles. Each track is further broken down into sectors that are arranged sequentially. That is, each sector on a track is adjacent to the previous and next sector. Generally, each of the surfaces in a disc drive has a recording head for reading and writing data to a sector with one head per surface of the disc. Data is accessed by moving the heads from the inner to outer part (and vice versa) of the disc drive by an actuator assembly. During a data access operation, one of the heads is positioned over the desired location of a sector on the disc in order to access (i.e., read or write) the sector.

Implementations of the technology described herein are disclosed herein in the context of a read channel throughput management system. Reference will now be made in detail to implementations of the technology described herein as illustrated in the accompanying drawings and the following detailed description to refer to the same or like parts.

Magnetic media storage drives store data in polarized cells on one or more magnetized media within each storage drive. A magnetic disc drive is one implementation of a magnetic media storage drive in which the magnetic medium is a disc and the polarized cells are arranged on the disc in concentric, generally circular tracks. In operation, one or more of the discs rotate at a constant high speed within the storage drive while information is written to and read from the tracks on the disc(s) using an actuator assembly. The actuator assembly rotates during a seek operation about a bearing shaft assembly positioned adjacent the discs.

The actuator assembly includes one or more plurality of actuator arms that extend towards the discs. Mounted at the distal end of each of the actuator arms is a head with a read pole and a write pole. The write pole generates a magnetic field adapted to change the magnetic polarization of the cells on a corresponding disc (i.e., it writes data to the disc) and the read pole detects the magnetic polarization of the cells on the corresponding disc (i.e., it reads data from the disc).

In a non-shingled magnetic medium, each of the cells on the magnetized medium are of a sufficiently large size relative to the size of the write pole to allow the write pole to write data to the cells without overwriting data in any surrounding cells. As a result, data may be randomly written to available cells anywhere on the magnetic medium. However, as requirements for data storage density increase for the magnetic media, cell size decreases. A commensurate decrease in the size of the write pole is difficult because a strong write field gradient provided by a larger write pole is often required to shift the polarity of the cells on the magnetized medium. As a result, writing data to smaller cells on the magnetized medium using the relatively larger write pole may affect the polarization of an adjacent cells (i.e., overwrite the adjacent cells). One technique for adapting the magnetic media to utilize smaller cells while preventing adjacent cells from being overwritten during a write operation is shingled magnetic recording (SMR).

SMR utilizes a large strong write field generated by the write pole. One constraint of shingled magnetic recording is that when the data is written to the magnetic media, it is written in sequentially increasing or decreasing radius tracks. The strong write field overlaps a currently written track with a previously written track, leaving a relatively small strip of the previous write track unaffected, and also overlaps that currently written track with one or more not-yet-written tracks. The remaining strip of written data on the previously written track contains the aforementioned cells that, while merely a fraction of the feasible write size, are sufficiently large to be read using the read pole. As a result, while SMR still allows for traditional random access read operations, writes can no longer be done randomly because a single-track write modifies/overwrites the one or more not-yet-written (or yet-to-be written) tracks. As a result, in order to change any data cell within the shingled data, the entire shingled data is re-written in the selected sequential write order.

For example, in a disc drive using SMR, tracks on a disc are grouped together as a band and writing data to one track of the band may erase the data on the next adjacent track of that band. As a result, writing any data to a band requires writing data to the entire band. Thus, even if the amount of data to be written to a part of a band is small, the entire band has to be re-written to ensure that no data is lost during the write operation. As a result, random write operations to parts of band on SMR disc drive takes more time than non-SMR disc drives. Such loss of time is specifically large in case of SMR disc drives with bigger band size, such as, for example, 100 tracks/band.

Such loss of time can be significant when large quantity of data is written to SMR bands. The technology disclosed herein presents a solution that reduces such loss of time for certain types of data. For example, from the trace analysis of video acquisition benchmarks, it is observed that while video streams are substantially sequential in nature, they are not purely sequential. Typically, the video stream writes arrive as bursts of 1-4 MB packets, resulting from sets of sequential commands. Furthermore, typically multiple streams are active over the drive and often there may be multiple active streams that are directed to a given SMR band. For example, in client applications the number of streams is usually less than eight, whereas in enterprise level video streaming systems the number of active streams can be as high as 250. The technology disclosed below presents a solution that efficiently handles video streams or other substantially sequential workloads on SMR drives.

Specifically, the method and system disclosed herein uses open bands as destination bands for the incoming sequential data. Thus, the large write packets of sequential stream are handled as virtual streams and written directly to such open bands in accordance with SMR writing rules. Thus, the logical block address (LBA) space is virtualized within band boundaries. This approach provides an efficient solution especially when the workload has high temporal locality and when the number of bands being written at any given time is limited to a few hundred. Examples of such workload include workload generated by video streaming data, workload in some cloud solutions such as that for Hadoop data warehouse, etc. In one implementation, the streaming data includes at least one of a plurality of small fragments and multiple interleaved streams. For example, the streaming data may have intervals between such small fragments and the multiple interleaved streams.

In addition to improving performance in devices utilizing shingled magnetic recording (SMR), the herein disclosed technology may also improve performance in devices utilizing interlaced magnetic recording (IMR). IMR utilizes alternating data tracks of different written track widths arranged with slightly overlapping edges so that a center-to-center distance between directly adjacent tracks (e.g., the track pitch) is uniform across the surface of the magnetic medium. A first series of alternating tracks have a wider written track width (e.g., even-numbered tracks) than a second series of interlaced data tracks (e.g., odd-numbered tracks). Each wide data track of the first series is written before the narrow and directly adjacent data tracks of the second series. In some systems, the alternating sets of IMR tracks have different linear densities. By manipulating the linear densities of the top and bottom data tracks and/or manipulating an order in which the data tracks are written, IMR systems can be tuned to exhibit a number of characteristics superior to CMR and SMR systems, such as increased ADC and system performance.

FIG. 1 illustrates functional components of a storage device 100 implementing fragmented data storage bands. Specifically, FIG. 1 shows one or more functional circuits that are resident on a disc drive printed circuit board used to control the operation of the disc drive. The storage device 100 is operably and communicatively connected to a host computer 102. Control communication paths are provided between the host computer 102 and a disc drive microprocessor 104, the microprocessor 104 generally providing top-level communication and control for the storage device 100 in conjunction with programming for the microprocessor 104 stored in microprocessor memory (MEM) 106. The MEM 106 can include random access memory (RAM), read only memory (ROM) and other sources of resident memory for the microprocessor 104. Storage device 100 stores data on a storage media 110 such as magnetic discs, optical discs, etc. In one implementation, the storage media 110 may store data using SMR on a plurality of data bands 132, 134, 136, etc. Each of the data bands 132, 134, 136 may be mapped to logical block addresses (LBAs) that are managed by the interface 120.

Communication paths are provided between the host computer 102 and the storage media 110 via an interface 120 and a number of read/write channels 122 (referred to hereinafter as read channel 122 or as write channel 122). The interface 120 includes a disc drive platform buffer manager (PBM) 124, a buffer 128 and a formatter 126 (also known as common formatter, disc formatter, etc.). Data is transferred between the host computer 102 or other device and the storage device 100 by way of the interface 120. The buffer 128 facilitates high-speed data transfer between the host computer 102 or other device and the storage device 100. Data to be written to the storage device 100 is thus passed from the host computer 102 to the interface 120 and then to the write channel 122, which encodes and serializes the data into data symbols and provides the requisite write current signals to the heads of the storage media 110.

To retrieve data that has been previously stored in the storage media 110, read signals are generated by the heads of the storage media 110 and provided to the read channel 122. In one implementation of the storage device 100, the read channel 122 performs decoding and error detection and correction operations and outputs the retrieved data to the formatter 126 for subsequent transfer to the host computer 102 or other device.

In one implementation of the storage device 100, the interface 120 includes a fragmented band write module 130. The fragmented band write module 130 may be implemented as software, hardware, firmware, or combination thereof. The fragmented band write module 130 analyzes that incoming data from the host 102 to determine whether the data represents substantially sequential writes to the storage media 110. For example, the fragmented band write module 130 may monitor a series of write commands from the host 102 and determine that the target write bands as represented by the incoming write commands show high temporal and/or spatial locality. The locality may be determined based on whether a series of incoming streaming write commands in a given time window are directed to an area of the drive that is limited to a few percent of the drive capacity. Time window for locality detection could range from 2 minutes to 30 minutes and the spatial locality ranges of interest would be 0-10%. The other parameter that would be monitored is how fully the bands are being written before the streams dry up. As an example, if a series of incoming write commands are directed to a single SMR band 132, this series of write commands maybe determined to be sequential workload and therefore candidates for being handled as virtual streams and written directly to open bands in accordance with the technology disclosed herein.

Once the fragmented band write module 130 determines that the write data is sequential write data, it assigns a new band from the storage media 110 to the LBAs of the write data. For example, if the LBAs of the write data are mapped to a current (physical) band 136, instead of performing the normal SMR band rewrite operation to write data to the current band 136, the fragmented band write module 130 maps the LBAs of the write data to an open band 134. Thus, in effect, for a period of time when write data of high temporal locality is being received, the fragmented band write module 130 maps two bands, the current band 136 and an open band 134, to the LBAs of the write data.

As a result, the write data is written to the open band 134 and the corresponding LBA range in the current band 136 is invalidated. Once the fragmented band write module 130 determines that the incoming write data of high temporal locality or substantially sequential data has stopped, the fragmented band write module 130 enters a band closing state where any valid data that is left on the current band 136 is copied to the end of the open band 134. Once substantially all valid data from the current band 136 is copied to the open band 134, the current band 136 is released to a free pool of bands that can be used for data storage. The band 134 now becomes the new location for that logical LBA space—no further cleaning or defragmentation of this data is required since it is written in a mostly sequential manner. The operations of the fragmented band write module 130 are described in further detail in the following figures and the related description.

Figure 2:
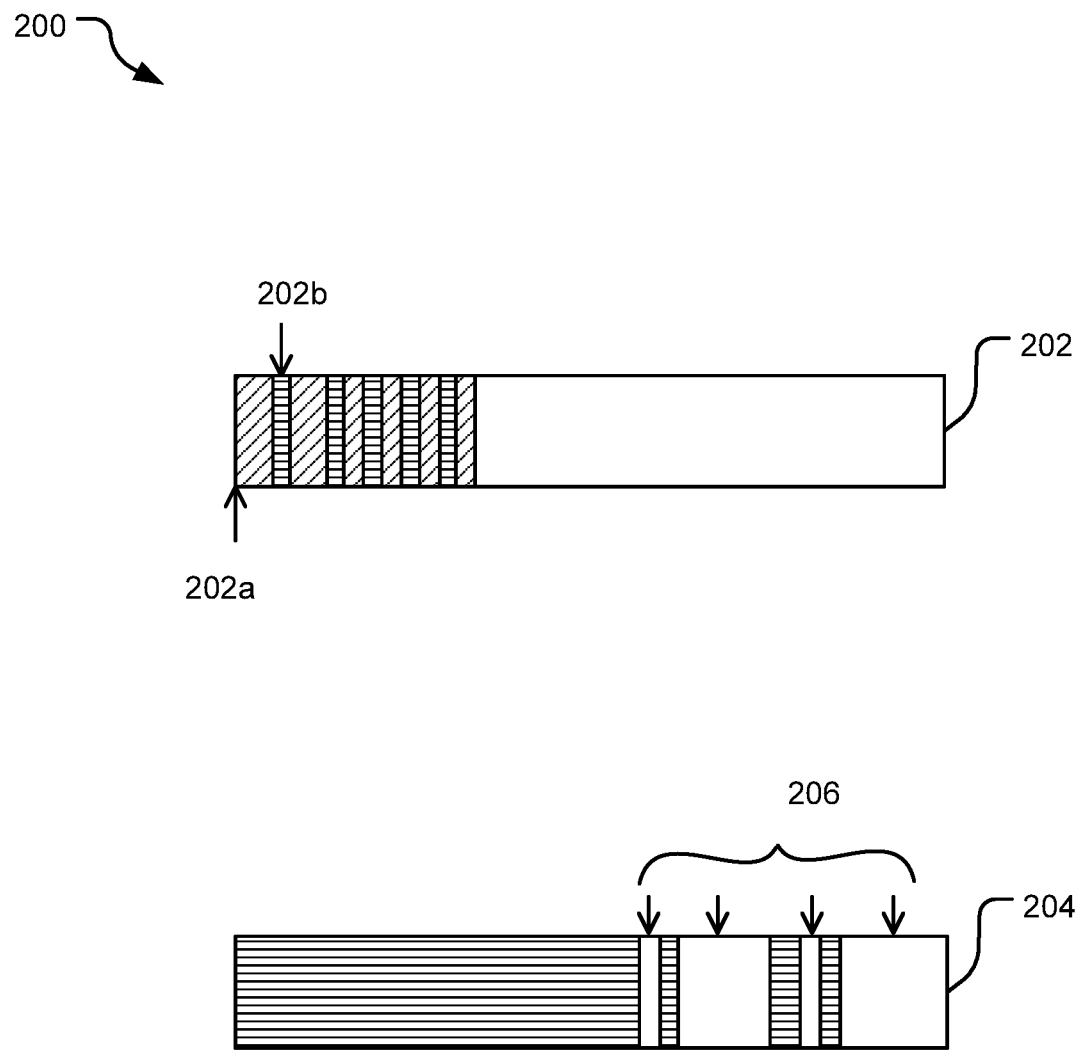
FIG. 2 illustrates an example band filling state of fragmented data storage bands to manage sequential writes.

FIG. 2 illustrates a block diagram 200 of a band filling state of fragmented data storage bands. Specifically, FIG. 2 illustrates an open band 202 and a current band 204 of an SMR storage media. When a fragmented band write module (not shown) of a storage device (not shown) determines that incoming write data is candidate for virtual stream, the write data is written to the open band 202. The band write module of the storage device may determine a write to be a streaming write based on one or more different criteria. For example, one criterion may be evaluating the transfer length of the write data. In such a case, a transfer length above a predetermined threshold may indicate a streaming write or a sequential write. Another criterion could be the detection of a set of sequential commands being received from the host.

For example, in FIG. 2, a first stream 202a and a second stream 202b are identified as being candidates for being virtual streams. The LBAs of the streams 202a and 202b may be mapped to sections of the current band 204. However, as these streams are identified as being substantially streaming or sequential data, the band write module of the storage device allocates sections of the open band 202 to the streams 202a and 202b. Thus, during the band filling state there are two physical bands (the current band 204 and the open band 202) assigned to the same LBA space. The open band 202 may be selected from a set of bands that may be determined from a free band list stored by the storage device. Note that while in FIG. 2, there are two streams 202a and 202b that are shown as alternating on the open band 202, in an alternative implementation, more than two streams may be alternating and sequentially stored on the open band 202. In one implementation, the data of the streams 202a and 202b are stored on the open band 202 in the order in which the data arrives. However, alternative mode of storing the data of such streams may also be used. For example, in an alternative implementation, the data streams 202a and 202b are stored on the open band 202 substantially in the order in which the data arrives. For example, a storage controller may apply some filtration to the data streams 202a and 202b so as to process slightly out of order commands and order them such that the writing to the storage media is more sequential. While only two streams are shown in the figure for illustration the concept can be extended to multiple sequential streams directed to the band.

The current band 204 shows the locations 206 where the data of the alternating streams 202a and 202b may be originally mapped to. In other words, if the open band 202 were not allocated, the data from the streams 202a and 202b would have been mapped to the one or more of the locations 206. As the streams 202a and 202b are written on the open band 202, the data at the locations 206 are invalidated. As more of the data from the streams 202a and 202b (or additional streams that were originally mapped to the current band 204) are written to the open band 202, more and more of the data of the current band 204 becomes invalidated. Furthermore, such writing of the data to the open band 202 instead of the current band 204 adds discontinuity when the switch to an alternative stream happens, resulting in LBA space mapped to the open band 202 and the current band 204 to be fragmented. In one implementation, the fragmented band write module of the storage device may maintain a table that tracks each of the LBA ranges of the streams and their mapping to either the current band 204 or to the open band 202.

As the band write module of the storage device writes data to the open band 202, it also monitors the incoming writes and/or tracks the allocation of resources within the system to determine when a band closing condition is satisfied. Upon satisfaction of the band closing condition, the band write module stops writing to the open band 202 and enter a band closing state. In one implementation, a band closing condition is satisfied when the storage device stops receiving sequential writes directed to the band, such as when the storage device has not received writes directed to LBAs of the open band 202 for a set period of time. In another implementation, the band closing condition is satisfied when it is determined that the open band 202 has been filled to a pre-determined capacity, such as when the open band 202 is close to being full (e.g., 80% of max capacity, 90% of max capacity).

In still another implementation, the band closing condition is imposed as a result of resource constraints on the number of physical storage resource allocated to a single logical band (LBA range). For example, the band write module may impose a cap on the quantity or size of storage resources allocated to a single logical band. When this cap is reached, the band closing condition is satisfied and the current band 202 is closed.

In still another implementation, the band closing condition is a resource preservation condition associated with a dynamically-allocatable resource pool, such as a pool of available physical bands that can be allocated to different logical bands at different times. For example, a resource condition may provide for closing of the open band 202 when the number of free bands in the pool has decreased to below some threshold.

Responsive to satisfaction of one or more conditions such as those example conditions described above, the band write module of the storage device enters a band closing state.

Figure 3:
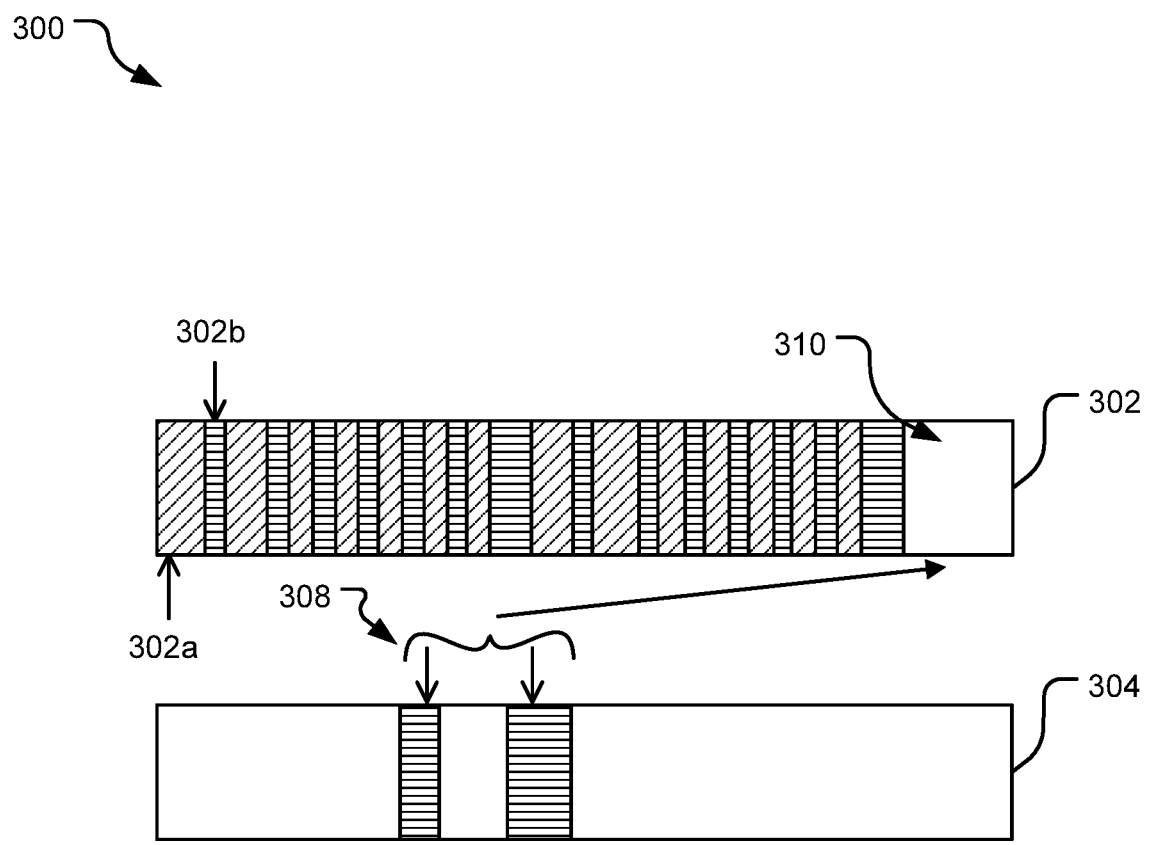
FIG. 3 illustrates an example band closing state of fragmented data storage bands used to manage sequential writes.

FIG. 3 illustrates a block diagram 300 of band closing state of fragmented data storage bands. Specifically, FIG. 3 illustrates an open band 302 and a current band 304 during a band closing state. At this state, most of the data from the current band 304 is invalidated and only a few sections of the data on band, as illustrated by sections 308 is valid. On the other hand, the open band 302 is substantially filled with the data of various streams 302a, 302b, etc., that were initially mapped to the current band 304 and as such only a small portion 310 of the current band 302 is unused and available. During the band closing state, the data from the remaining valid sections 308 of the current band is copied to the end of the open band 302 in the unused section 310. Subsequently, the data from the sections 308 is invalidated, resulting in all data from the current band 302 being invalidated. At this time, the current band 302 is marked as a free band, added to the list of free bands, and released to a free band pool so that it can be used for another stream.

Figure 4:
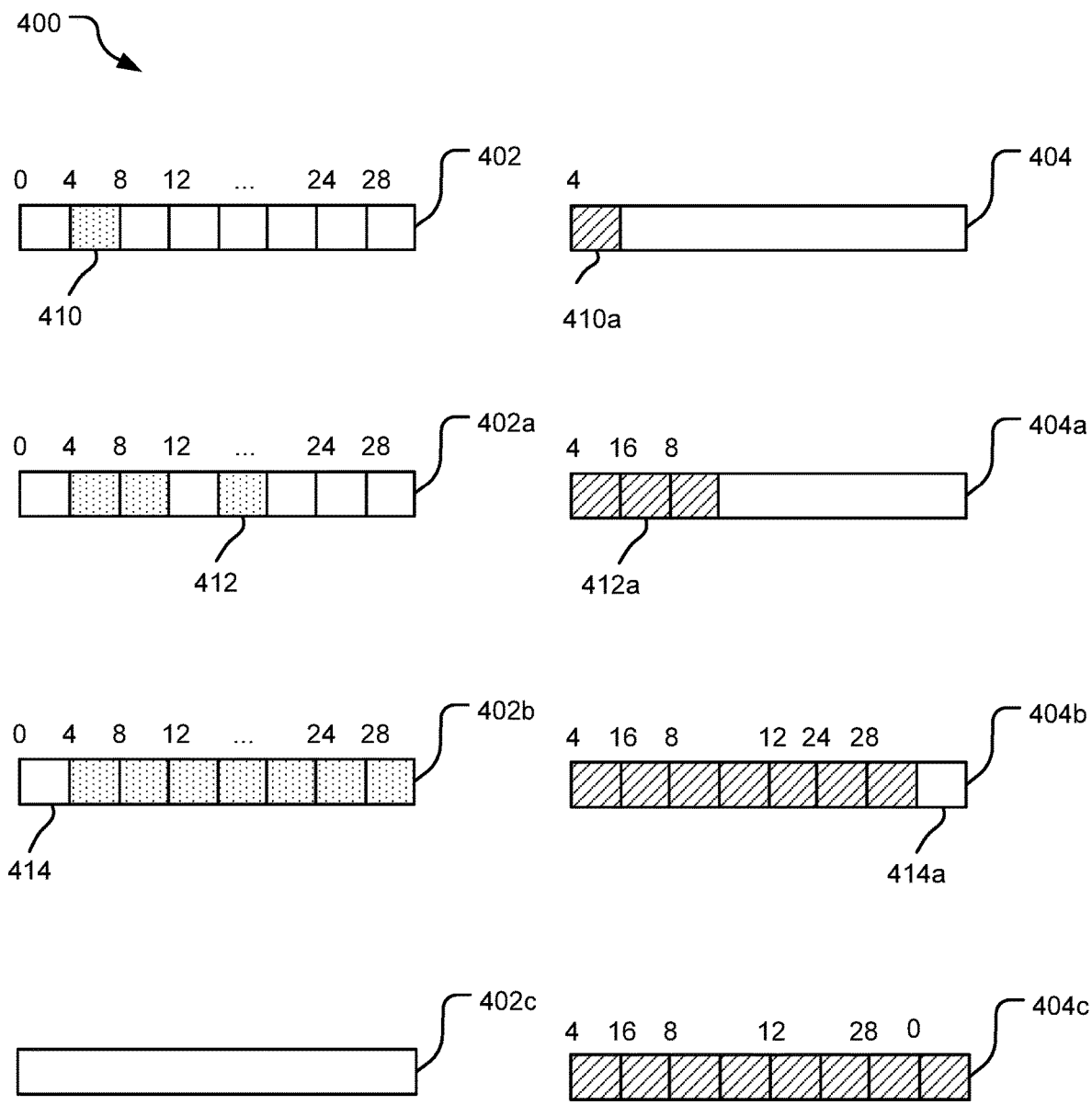
FIG. 4 illustrates an alternative example of band filling state of fragmented data storage bands to manage sequential writes.

FIG. 4 illustrates an alternative block diagram 400 of band filling state of fragmented data storage bands to manage sequential writes. The band filling is illustrated with a source band (or current band) 402 and a destination band (or open band) 404. In an implementation, each of these bands are SMR bands that are written sequentially from beginning of the bands (left) to the end (right). The source band 402 contains the current data for the band. The data is shown in blocks of 4 MB.

For example, the streaming writes W to the source band 402 are coming in the following order:

W: 4-7, 16-19, 8-11, 20-23, 12-15, 24-27, 28-31.

As the new streaming writes to the source band 402 are detected, a fragmented band write module of the storage device opens the destination band 404 as the new band for writing the streaming writes. For example, the fragmented band write module of the storage device may decide that the writes W are sequential in nature based on their temporal locality or transfer length. Once the destination band 404 is opened, the LBAs of the streaming writes W are assigned to the destination band 404. Thus for example, the LBAs for the streaming write $W_1$ (blocks 4-7) are mapped to the block 410a in the destination band 404. When the write to the block 410a in the destination band 404 is completed, the corresponding block 410 in the source band 402 is invalidated. Also, the mapping of the LBAs to the block 410 is cancelled as the write completes, i.e., the command status is sent back to the host. Subsequently, when the LBAs for the next streaming write $W_2$ (blocks 16-19) is mapped to block 412a in the destination band 404

This process of writing the streaming writes W to the destination band 404 continues until the fragmented band write module of the storage device determines that the stream of commands resulting in the streaming writes W has dried up. For example, such determination may be made based on a threshold time after receiving the last of the streaming writes W (blocks 28-31). Alternatively, a detection of another set of streaming writes to a different source band (other than 402) may trigger the decision that the streaming writes W has ended.

At this point, as a lot of the LBAs in source band 402 are mapped to the destination band 404 and because each of the blocks in the 402 for such writes have been invalidated, there are only a few valid blocks remaining in the source band. In FIG. 4, the source band at the state 402b shows that all of the blocks 4-28 have been invalidated due to the writes in the streaming writes W. As a result, only the block 414 (0-4) is still valid. As part of band closing state process, the fragmented band write module of the storage device copies the data from the block 414 to an open block 414a at the end of the destination band 404 and invalidates the block 414. At this point, all blocks of the source band 402 are invalidated, as illustrated by the state 402c. The fragmented band write module of the storage device now designates the source band 402 in the state 402c as an open band. The destination band 404 in the state 404c may be designated as a source band if a streaming write to the LBAs mapped to the destination band 404 is detected. In one implementation, once all blocks from the source band 402 are transferred to the destination band 404, no further cleaning activity is required in that the destination band 404 may store the transferred data permanently.

Figure 5:
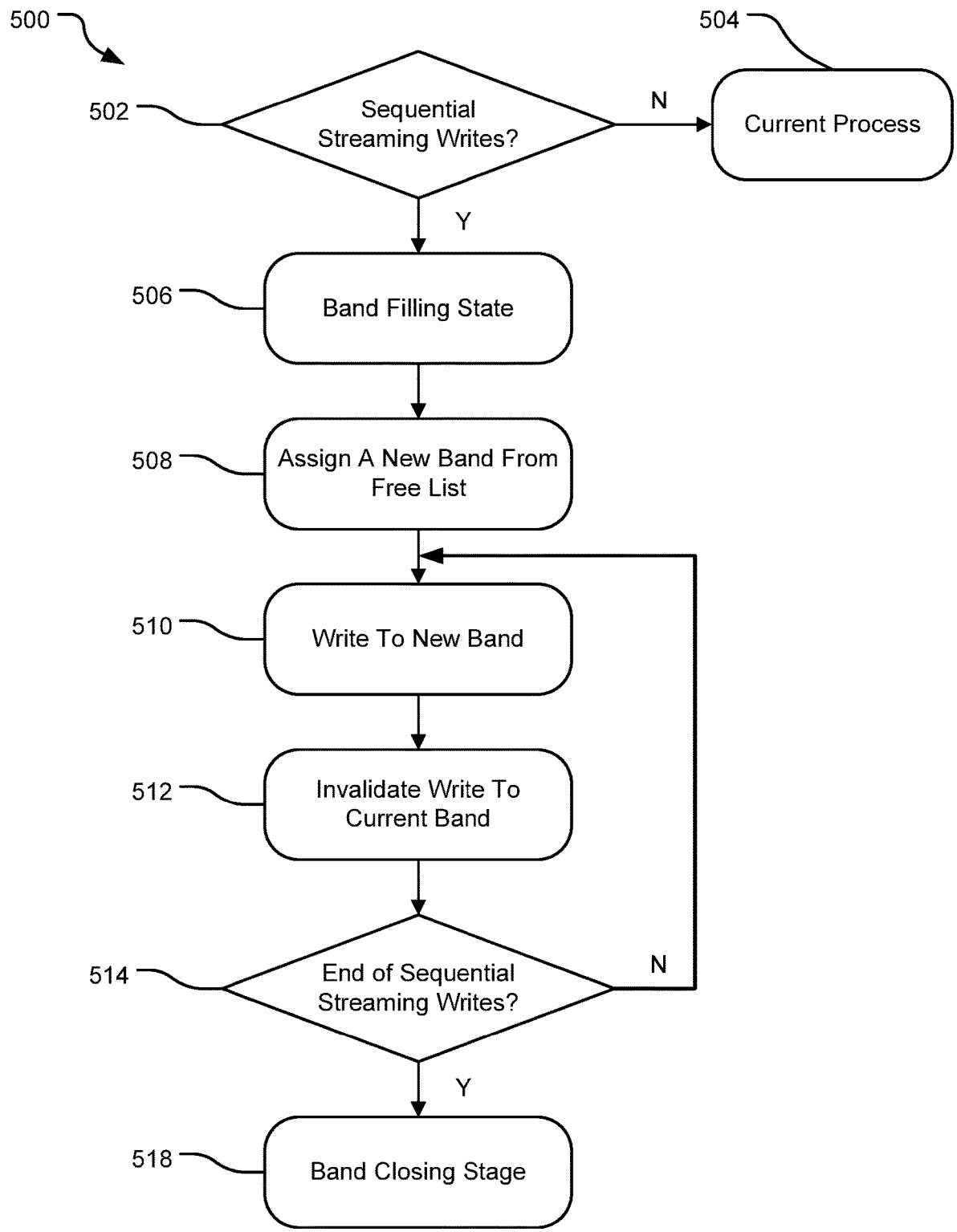
FIG. 5 illustrates example operations for using fragmented data storage bands to manage sequential nature of writes.

FIG. 5 illustrates operations 500 for using fragmented data storage bands to manage sequential nature of writes. An operation 502 evaluates an incoming stream of commands at a storage device to determine if they represent a sequential stream of writes to a source band. If they do not, an operation 504 processes the write commands as per the current process. If the operation 502 determines that the writes represent a sequential stream of writes, an operation 506 initiates a band filling state. An operation 508 assigns a new open band from a list of open bands as a destination band for the incoming stream of writes. Subsequently, an operation 510 writes from the blocks of streaming data to the destination band. Once a block of data is written to the destination band, an operation 512 invalidates a corresponding block in the source band.

An operation 514 evaluates if the stream of sequential writes to the source band has ended. If not, the process of writing the write blocks to the destination band and invalidating the corresponding blocks in the source band continues. If the operation 514 determines that the stream of sequential writes have ended, an operation 516 initiates a band closing state, which is illustrated in further detail below in FIG. 6.

Figure 6:
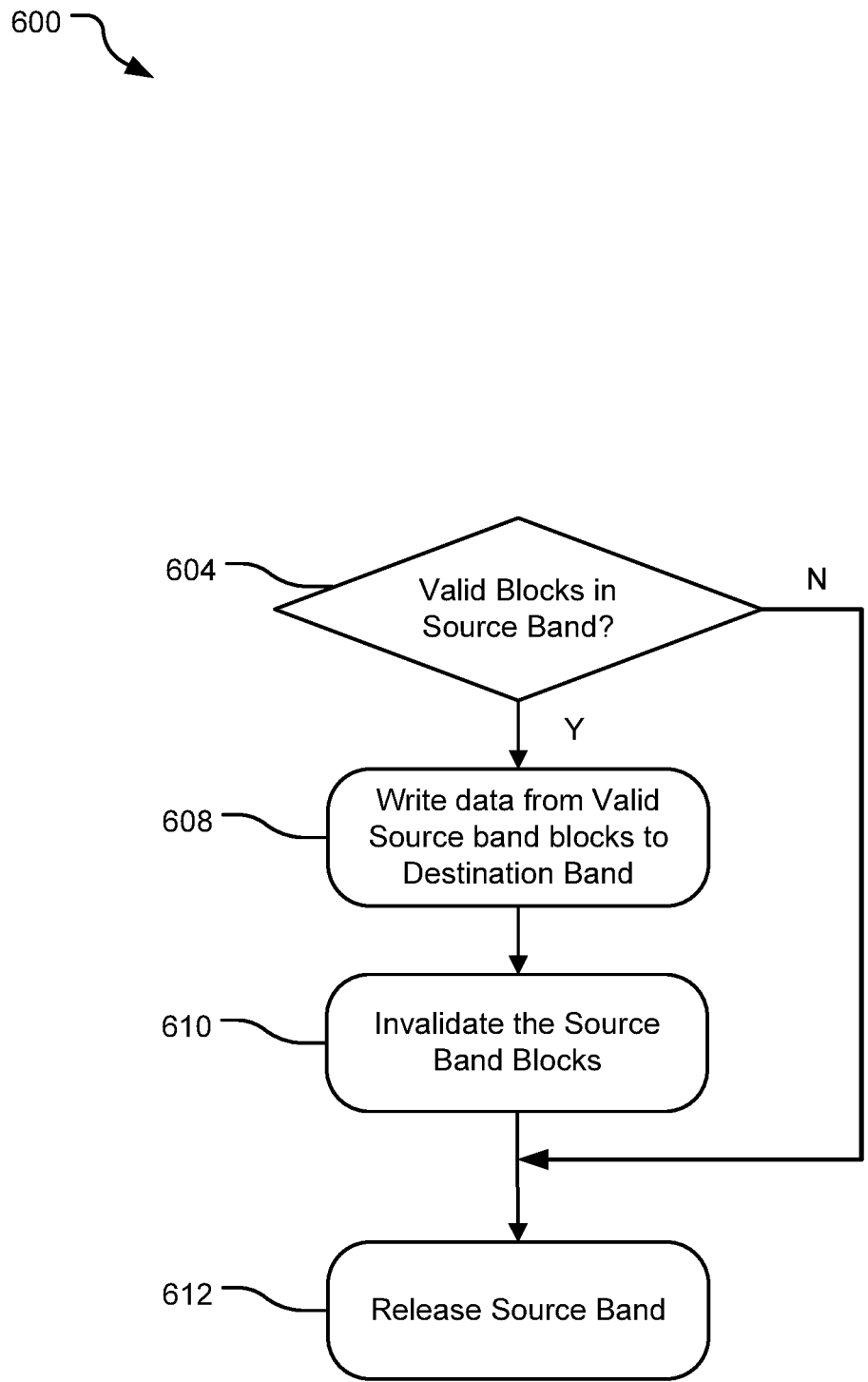
FIG. 6 illustrates example operation of a band closing state for using fragmented data storage bands to manage sequential nature of writes.

FIG. 6 illustrates operation 600 of a band closing state. An operation 604 determines if the source band has any valid blocks. If so, an operation 608 writes data from the valid blocks in the source band to open blocks in the destination band. Specifically, the block in the destination band is selected to be the next available block. Once data from valid block in the source band is written to the destination band, an operation 610 invalidates the source band blocks. After data from all valid blocks in the source band is written to the destination band, an operation 612 releases the source band to the list of open bands so that such open band can be used as a destination band for subsequent writes of sequential streaming data.

Figure 7:
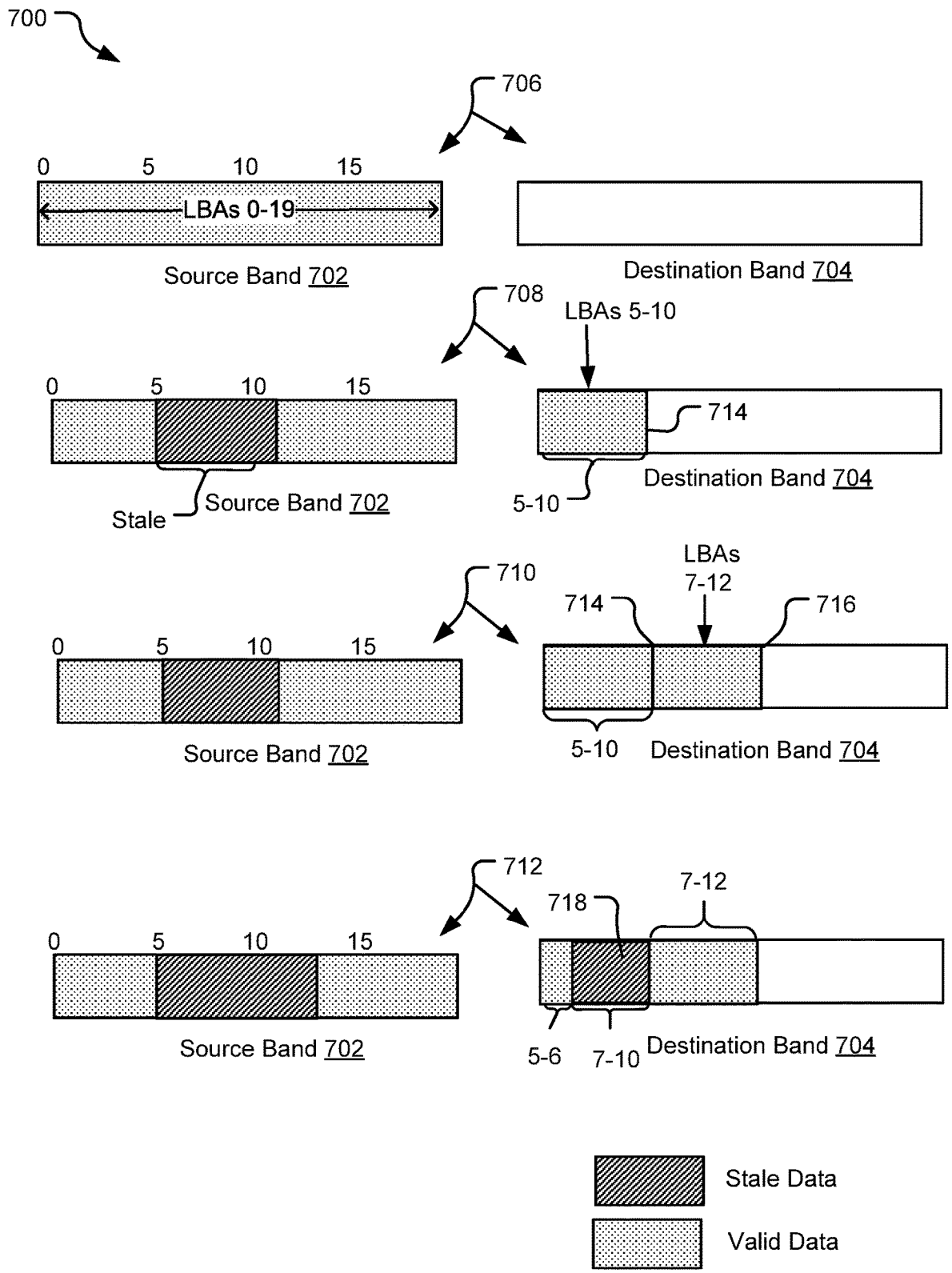
FIG. 7 illustrates example band filling and overwrite operations in a system that utilizes fragmented data storage bands.

FIG. 7 illustrates example band filling and band overwrite operations in another system 700 that utilizes fragmented data storage bands. At a first point in time indicated by state 706, a source band 702 stores storing valid data that spans a sequential range of LBAs (e.g., from 0-19). In the illustrated example, the storage device receives a sequence of write commands associated with the LBAs of the source band 702, identifies and opens an unused (free) destination band 704, and assigns the destination band 704 to the same, full range of LBAs that is associated with the source band (e.g., 0-19). In one implementation, both the source band 702 and the destination band 704 are bands of consecutive data tracks in a shingled storage region of a shingled magnetic recording (SMR) device. In another implementation, both the source band 702 and the destination band 704 are bands of interlaced data tracks in an interlaced magnetic recording (IMR) device.

The assignment of the destination band 704 to the range of LBAs of the source band 702 serves to temporarily reserve the destination band 704 for storage of data associated with the LBAs of the source band 702 but does not in itself map the physical data blocks of the destination band 704 to the LBAs of the source band 702. Rather, blocks of the destination band 704 are dynamically assigned to LBAs as the incoming data is written according to an order of data receipt.

At another point in time illustrated by state 708, the storage device has received and processed a first one of the received write commands. This first command is an update to data stored in LBAs 5-10 of the source band 702. Writing this data of the first command entails identifying a write pointer position within the destination band 704 (e.g., initially at the beginning of the destination band 704) and sequentially writing the data of the incoming LBAs 5-10 to the destination band 704 in a forward write direction from the write pointer, sequentially filling consecutive data blocks of the destination band 704, as shown.

Following the write of the LBAs 5-10 to the destination band 704, the write pointer for the destination band 704 is moved to a new position 714, indicating the end of the last-written data block in the destination band 704. Additionally, the storage device identifies and marks as stale data rendered invalid by the newly-written data. In this case, the newly-written data of LBAs 5-10 in the destination band 704 renders invalid corresponding blocks of the source band 702 previously-mapped to the same LBA range (5-10). As also illustrated by the state 708, the storage device marks these identified corresponding data blocks in the source band 702 as invalid.

At a later point in time illustrated by state 710, the storage device has received and written a second write command of the received sequence. This second write command specifies an update to data stored in LBAs 7-12. In this scenario, the write command to LBAs 7-12 is an update to some valid data that is currently in the source band 702 (e.g., LBAs 11-12 are still valid in the source band 702), and some valid data that is currently stored in the destination band 704 (e.g., LBAs 7-10). Writing data of the second command entails identifying the current write pointer position within the destination band 704 (e.g., position 714), and sequentially writing the incoming data of LBAs 7-12 to consecutive data blocks of the destination band 704 starting at the write pointer position 714 and continuing in the forward write direction. Following the write of the LBAs 7-12 to the destination band 704, the write pointer is moved from the position 714 to a new position 716, marking the end of the last-written data block in the destination band 704.

At a state 712 following the state 710, the storage device has identified the location of previously-written data corresponding to the newly-written LBAs 7-12 and marked these data blocks as stale. In this step, LBAs 11-12 of the source band 702 are marked as stale. Consequently, the source band 702 now stores stale data corresponding to blocks corresponding to LBAs 7-10 (described above) and also for LBAs 11-12. Additionally, the storage device has identified and marked as stale a range of blocks 718 in the destination band 704, which previously stored valid data of LBAs 7-10.

The above methodology generally provides for filling of the destination band 704 without re-writing any of its data blocks from the time that the destination band 704 is opened to the time that the destination band 704 reaches capacity and is closed. Incoming writes to LBAs of the range assigned to the destination band 704 are written in the forward write direction beginning at the current position of the write pointer (marking the end of the immediately prior write to the destination band) and continuing sequentially in the forward write direction. In shingled magnetic recording systems, this technique allows data to be written to disk more quickly than in traditional scenarios where data updates are directed to overwrite other (filled) portions of the source band or the destination band. This increase in performance is attributable to the reduced seek times that area realized when data of a command sequence is written in a purely sequential forward-direction as compared to periodic seeks of the actuator arm to re-write previously-written data blocks.

Figure 8:
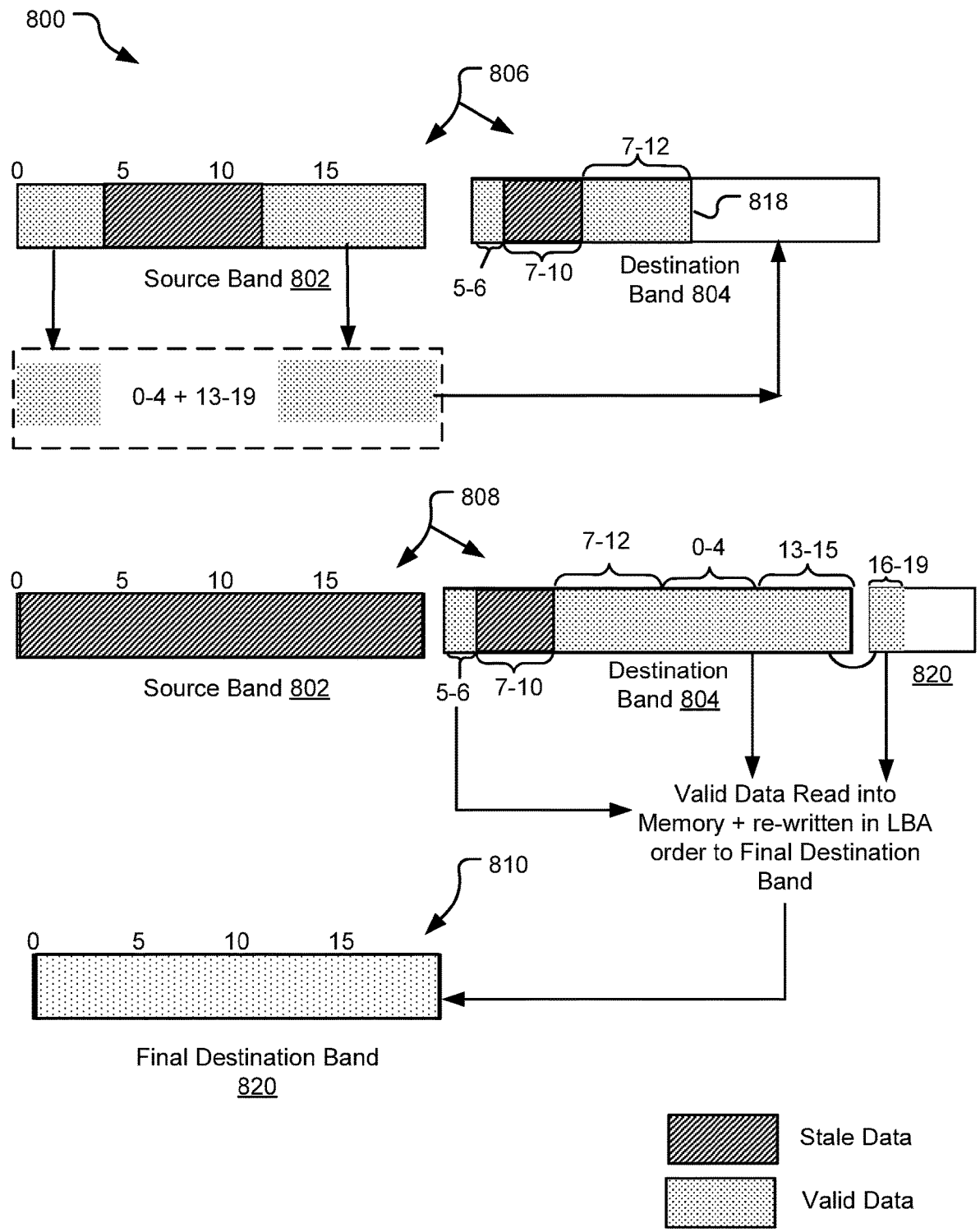
FIG. 8 illustrates example band closing operations in another system that utilizes fragmented data storage bands.

FIG. 8 illustrates example band closing operations in another system 800 that utilizes fragmented data storage bands. At a first point in time indicated by state 806, a source band 802 is assigned to store data of a sequential range of LBAs (e.g., from 0-19) that have been assigned to a corresponding destination band 804. In one implementation, the state 806 corresponds to a fill state 712 described with respect to FIG. 7. In this case, the source band 802 and the destination band 804 have been filled according to operations the same or similar as the exemplary operations described with respect to FIG. 7. The source band 802 stores some valid data (e.g., LBAs 0-4 and 13-19) and some data that has been marked as invalid (e.g., LBAs 5-12). The destination band 804 stores valid data corresponding to LBAs 5-12 (absent from the source band 802).

At the state 806, the storage device elects to close the source band 802. In one implementation, the storage device elects to close the data band 802 in response to determining that it is no longer receiving write commands associated with the LBA range of the source band 802 and destination band 804. This may occur when, for example, a threshold period of time has elapsed since the last-executed write to the destination band 804 and/or when the storage device is idle (e.g., no longer receiving read/write commands from a host).

At the state 806, the storage device reads all remaining valid data of the source band 802 into memory and prepares to write this data back to the destination band 804 in a forward-write direction beginning at a first available data block in the destination band 804 (as indicated by a current position 818 of a write pointer). In preparing to move this valid data to the destination band 804, the storage device checks the available capacity remaining in the destination band 804.

In the illustrated example, the destination band 804 does not have enough available capacity remaining to receive and store all of the valid data from the source band 802. In the illustrated example, this is the case because—although the destination band 804 is equal or greater in size than the source band 802—the destination band 804 stores duplicative versions of both invalid and valid data for some LBAs of the assigned LBA range. Specifically, the destination band 804 stores an invalid version of LBAs 7-10 and a valid version of these LBAs as well. This devotion of band capacity to store duplicative versions of LBAs (e.g., a valid version and one or more prior invalid versions) can result in the scenario where there is not enough free space remaining at the end of the band—e.g., beyond the write pointer position 818—to store the remaining valid data of the source band 802.

Responsive to determining that the destination band 804 does not include enough free capacity following the position 818 of the write pointer to store all valid data of the source band 802 (e.g., LBAs 0-4 and 13-19), the storage device assigns an overflow region 820 to the LBA range of the destination band 804 and the source band 802.

The overflow region 820 may assume different forms in different implementations. In one implementation, the overflow region 820 is region of a write cache. For example, the overflow region may include unshingled data tracks in a write cache of a shingled magnetic storage device. In another implementation, the overflow region 820 is a secondary destination band, such as a new (unused) band of shingled data tracks in a shingled magnetic storage device. In still another implementation, the overflow region 820 is a band of interlaced tracks in an IMR system.

At a subsequent state 808 of the system, the storage device has written the valid data read from the source band 802 to the destination band 804 and the overflow region 820. This data is written sequentially, according to consecutive LBA order, from the position 818 of the write pointer in the destination band 804 to the end of the band. When the end of the destination band 804 is reached, an overflow portion of the valid data read from the source band 802 is written to the overflow region 820. The write to the overflow region 820 is according to the LBA-consecutive fill order, beginning at the first available block in the overflow region 820 and extending in the forward write direction until all the remaining valid data is written.

In the example of FIG. 8 shown at the state 808, valid LBAs 0-4 and 13-15 are written consecutively to the end of the destination band 804, as shown. There is insufficient capacity in the destination band 804 to store the LBAs 16-19 (the very last few valid blocks read from the source band 802). Consequently, these blocks are written to the overflow region 820.

At a subsequent state 810 of the system, all valid data of the destination band 804 is read into memory and re-written to sequentially fill consecutive data blocks of a final destination band 822 according to an LBA consecutive fill order, allowing the data to be subsequently read back from the storage device at a higher read throughput.

In one implementation, the final destination band 822 is the source band 802. In this case, data blocks of the destination band 804 may be released (unassigned to the LBA range of the source band 802) and made available to store other data. In another implementation, the final destination band 822 is the destination band 804, in which case the data blocks of the source data band 802 may be released and made available to store other data. In still another implementation, the final destination band 822 is a new (unused) band of consecutive data tracks that is neither the source band 802 or the destination band 804. In this case, both the source band 802 and the destination band 804 are released and made available to receive and store other incoming data.

Figure 9:
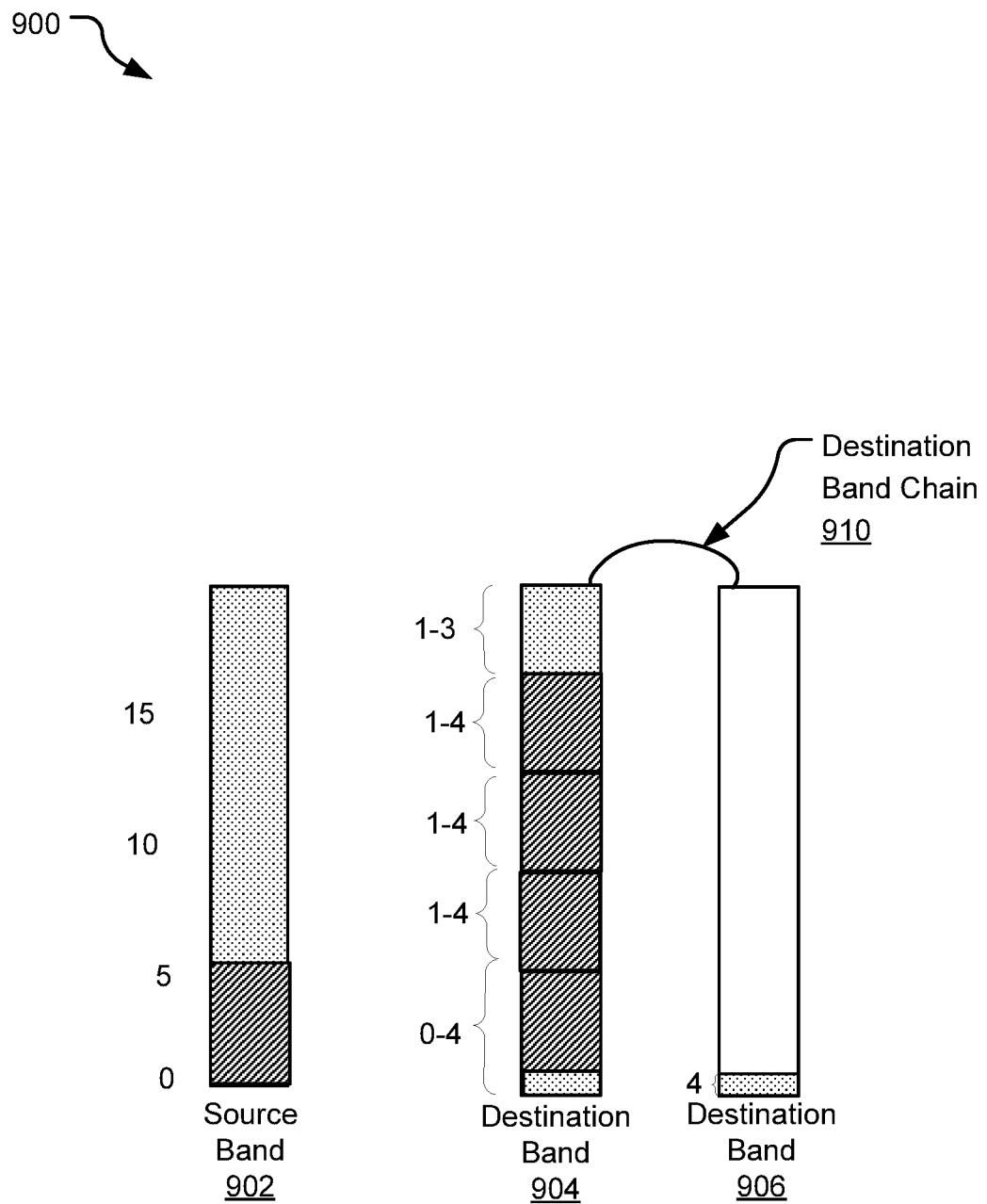
FIG. 9 illustrates example band overflow operations in another system that utilizes fragmented data storage bands.

FIG. 9 illustrates example band overflow operations in another system 900 that utilizes fragmented data storage bands. While a source band 902 stores valid data that spans a sequential range of LBAs (e.g., from 0-19), the storage device receives a sequence of write commands associated with the LBAs of the source band 902. In response to the sequence of write commands, the storage device identifies and opens an unused (free) destination band 904, and assigns the destination band 904 to the range of LBAs associated with the source band (e.g., 0-19). In one implementation, both the source band 902 and the destination band 904 are bands of consecutive data tracks in a shingled storage region of a shingled magnetic recording (SMR) device.

After opening the destination band 904, the storage device processes a first command of the received sequence of write commands. This first write command includes an update to LBAs 0-4. The storage device writes the updated data to a first sequential portion of the destination band 904 and marks corresponding data blocks of the source band 902 as stale (as shown). Following this write, the storage device processes the next several commands of the received sequence. These commands instruct the storage device to repeatedly update a same subset (e.g., LBAs 1-4) of the range of LBAs. The storage device executes each command by writing the associated data to the destination band 904 starting at a write pointer position, filling the band in a forward direction fill order, updating the write pointer position, and marking a prior versions of the LBA range as stale. This results in the scenario where the destination band 904 is filled with repeated writes to the LBA subset 1-4.

Prior to executing each write command in the received sequence of write commands, the storage device determines whether there exists sufficient space in the destination band 904 to store the incoming data of the write command. In the illustrated example, the storage device determines, after re-writing the same LBA range (e.g., LBAs 1-4) four times, that there exists insufficient space in the destination band 904 to store all four LBAs (1-4) updated by the fifth command received in the sequence. In this scenario, the storage device identifies and opens a second destination band 906 (an example overflow region). Like the destination band 904, the second destination band 906 is also assigned to the LBA range of the source band 902.

Conceptually, the second destination band 906 can be understood as forming a destination band chain 910 with the destination band 904. The storage device continues writing the data of the incoming command sequence by sequentially filling consecutive data blocks of the destination band 906 with the received data according to the order that the data is received and processed by the storage device. In the fill state illustrated by FIG. 9, the second destination band 906 is empty except for LBA 4, which is stored at the beginning of the destination band 906 as defined by a forward write direction of the storage device.

The second destination band 906 may be filled in a manner the same or similar as the destination band 904 (e.g., and consistent with or similar to the exemplary operations described with respect to FIGS. 7 and 8). If the second destination band 906 reaches a maximum capacity before the end of the incoming command sequence associated with the LBA range, the storage device may extend the destination band chain 910 by opening yet another (third) destination band and assigning the new band the LBA range of the source band 902.

Figure 10:
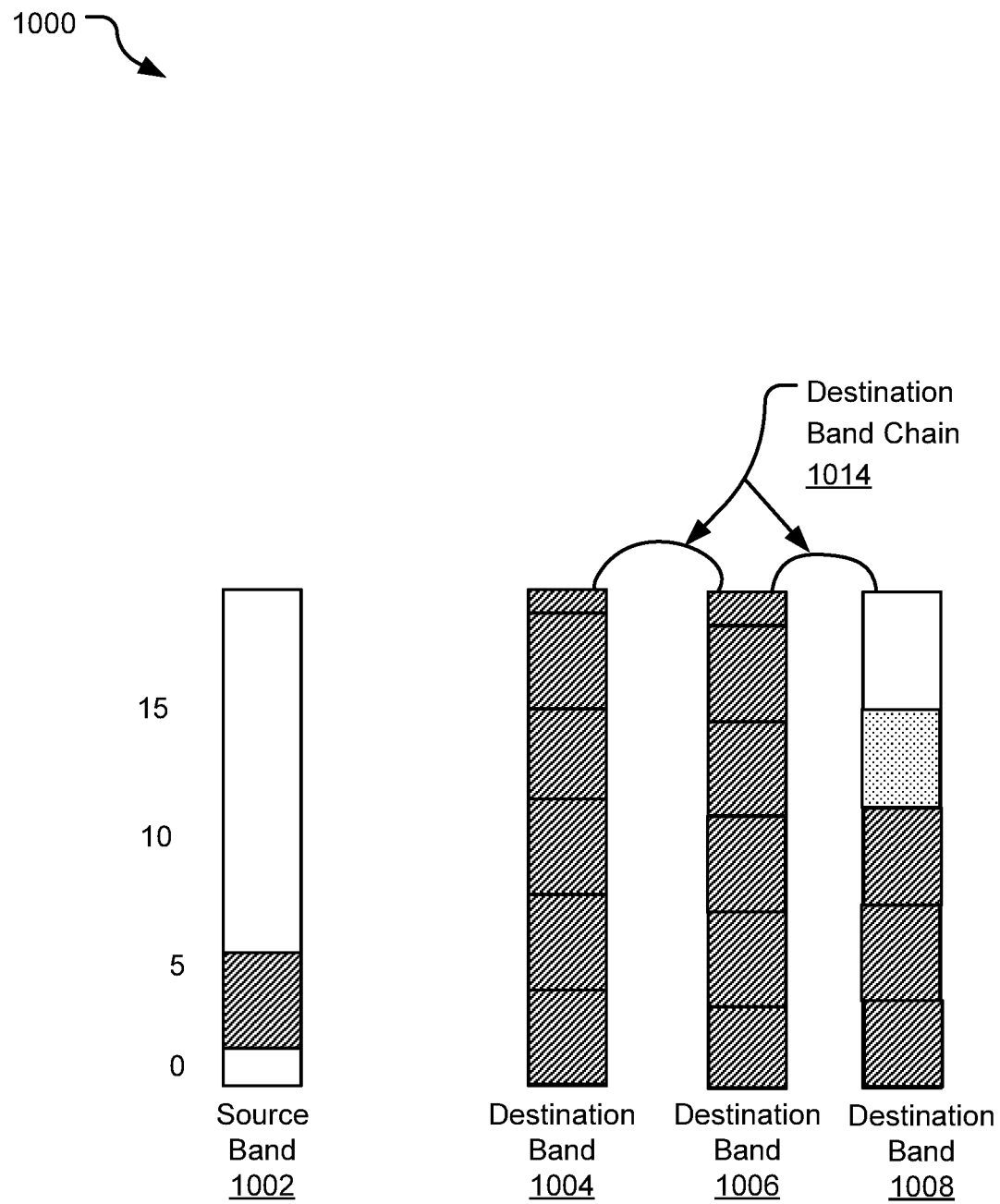
FIG. 10 illustrates additional example band overflow operations in another system that utilizes fragmented data storage bands.

FIG. 10 illustrates additional example band overflow operations in another system 1000 that utilizes fragmented data storage bands. A source band 1002 stores valid data that spans a sequential range of LBAs (e.g., from 0-19). Multiple destination bands 1004, 1006, 1008 of a destination band chain 1014 have been assigned to the LBA range of the source band 1002. In this example, a same LBA range (1-4) has been rewritten several (e.g., 14) times. Each repeated write of this LBA range directs data to a next sequence of available data blocks identified by a current write pointer position, filling each band of the destination band chain 1014 in a forward write direction. After each write, a write pointer position is updated and moved between the different destination bands (as necessary) until the storage device elects to close the source band 1002, such as at a time when repeated writes to the LBA range of the source band 1002 are no longer being received.

This example of repeated writes to a duplicative LBA range (1-4) is meant to illustrate one of many potential scenarios where a chain of destination bands may be used to store data of an incoming series of writes that are all associated with the LBA range of a same source band (e.g., the source band 1002).

When the storage device determines that writes to the LBA range of the source band 1002 are no longer being received (e.g., when a threshold period of time has elapsed since receipt of a write command directed to the LBA range of the source band 1002), the storage device commences a series of band closing operations to close the source band 1002 and the destination band 1004. In one implementation, exemplary band closing operations entail reading all valid data from the source band 1002 and the destination band chain 1014 into memory and re-writing the valid read data to sequentially fill another band (e.g., either the source band 1002, the destination band 1004, or a another band) with the valid data arranged according to an LBA-sequential fill order, such as in the manner described above with respect to FIG. 8.

Figure 11:
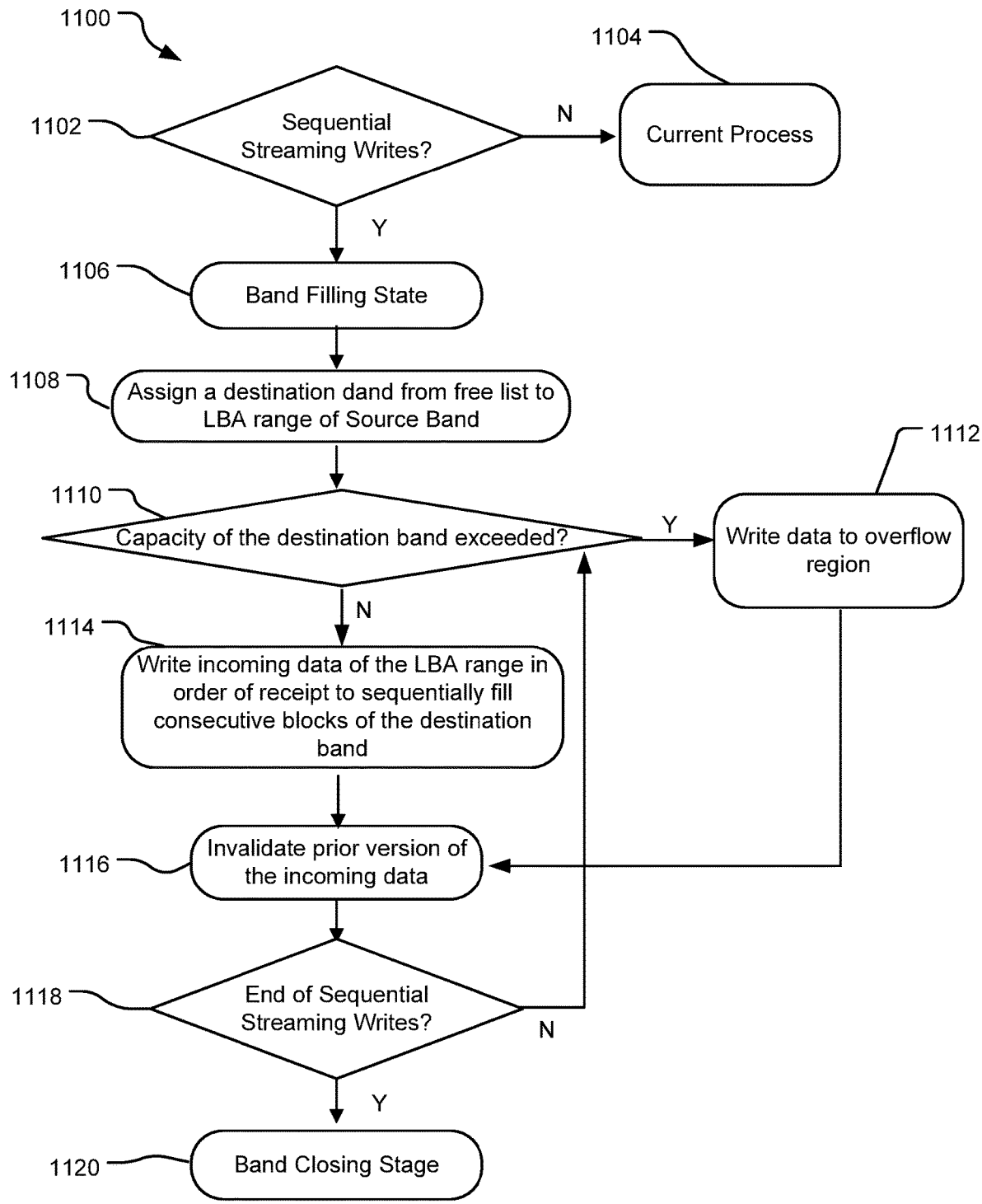
FIG. 11 illustrates example operations for using fragmented data storage bands to manage writes that are received sequentially and associated with data of a same data band in an SMR device.

FIG. 11 illustrates example operations 1100 for using fragmented data storage bands to manage writes that are received sequentially and associated with data of a same data band in an SMR device. A determination operation 1102 evaluates an incoming stream of commands at a storage device to determine if they represent a sequential stream of writes to a source band. If they do not, an operation 1104 processes the write commands as per the current process.

If the operation 1102 determines that the writes represent a sequential stream of writes, an operation 1106 initiates a band filling state. An assignment operation 1108 assigns a new open band from a list of open bands (e.g., a "free list") as a destination band that serves as the target storage area for the incoming stream of writes. The assignment operation effectively reserves the destination band for storage of data pertaining to an LBA range mapped to the source data band. According to one implementation, data blocks of the destination band are dynamically assigned as the data is written to the band rather than at the time that the band is opened and assigned to the source band.

Prior to executing each command of the incoming stream of commands, a capacity verification operation 1110 verifies that there exists sufficient unused storage capacity in the destination band to receive data of the command. If, for example, an incoming write command specifies a write of 28 LBAs in length, the capacity verification operation 1110 may verify that the destination band includes at least 28 used (empty) consecutive data blocks that can be mapped to the LBA range specified by the write command. Provided that there is sufficient available capacity in the destination band, a write operation 1114 writes incoming data of the LBA range in order of receipt to sequentially fill consecutively-ordered physical blocks of the destination band.

If the capacity verification operation 1110 determines that the destination band does not include enough available free space to store data of one of the commands of the incoming stream, a writing operation 1112 writes the data to an overflow region. In one implementation, the overflow region is a region of unshingled (e.g., non-overlapping) data tracks within a write cache.

In another implementation, the overflow region is a new destination band, such as another unused shingled data band. For example, the write operation 1112 may provide for assigning an additional (e.g., a secondary) destination band to the LBA range associated with the source band and the destination band, where each of the source band, destination band, and the additional destination band are shingled data bands in a shingled magnetic storage system. In one such implementation, the write operation 1112 begins writing the data of incoming streams to sequentially fill physically adjacent data blocks in the band according to a consecutive physical block order while writing incoming data according to the general order that it is received. For example, the first write to the additional destination band writes data from the start of the first band to a first pointer position; the second write to the additional band writes data from the first pointer position to a second pointer position; and so on.

In some scenarios, the degree of processing overhead associated with closing a secondary destination band (e.g., shingled storage space) is higher when the secondary destination band stores a small amount of valid source band data than when the secondary destination band stores a larger amount of source band data. For this reason, it may be advantageous for the storage device to utilize an unshingled write cache as the overflow region rather than a secondary destination band when the quantity of overflow data to be directed to the overflow region is small relative to the band size utilized on the storage device. If, in contrast, the series of sequential writes re-writes nearly the entire source band, performance may be improved when a secondary destination band is used as the overflow region since the data in the source band is mostly invalidated and the cost to reclaim (e.g., close and re-write in LBA order) the band is low.

After writing data of each command of the stream of incoming writes according to either the write operation 1112 or the write operation 1114, a stale data invalidation operation 1112 invalidates prior versions of the newly-written data. If, for example, the write command provides for a write of LBAs 2-7, the data blocks of the source band initially mapped to LBAs 2-7 are marked as invalid after the new data for LBAs 2-7 is written to the destination band.

In some scenarios, an incoming write command of the stream of sequential writes may provide for an update to data already updated one or more times. For example, the incoming stream may include a command providing for a write of LBAs 3-8 after LBAs 2-7 have already been written to the destination band and marked as invalid in the source band. In this scenario, the write operation 1112 or 1114 writes the incoming LBAs 3-8 sequentially (e.g., starting from a write pointer position in the destination band or the overflow region), and the invalidation operation 1116 invalidates the prior version of LBAs 3-7 in the destination band.

After the prior version of the incoming data has been invalidated per the invalidation operation 116, a determination operation 1118 determines whether the stream of sequential writes to the source band has ended. If not, the process of writing the write blocks to the destination band (or overflow region(s)) and invalidating the previous version of the corresponding blocks continues. If the determination operation 1118 determines that the stream of sequential writes have ended, an operation 1120 initiates a band closing state, which is illustrated in further detail below in FIG. 12.

Figure 12:
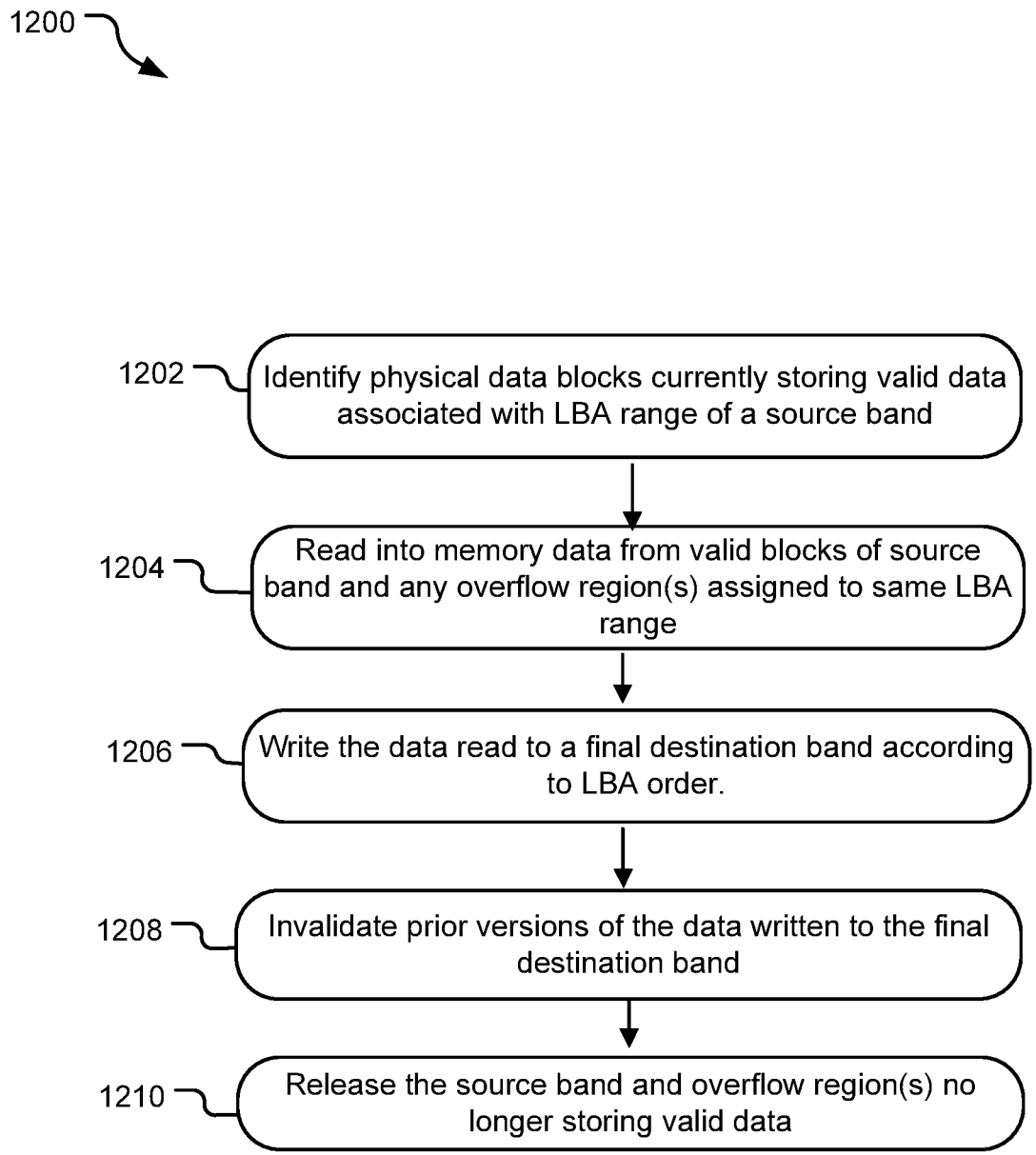

FIG. 12 illustrates example operations 1200 for closing a data band after a destination band and one or more overflow regions (e.g., write cache regions or additional destination bands) have been assigned and written to.

An identification operation 1202 identifies all physical data blocks currently storing valid data assigned to an LBA range of a source band, which may have characteristics the same or similar to those described above with respect to FIG. 11. As described with respect to the operations 1100 of FIG. 11, data corresponding to the LBA range of a source band may, during a band fill process, be written to a destination band or one or more different overflow regions (e.g., additional destination bands or write cache regions).

Following the identification operation 1202, a read operation 1204 reads into memory all valid data blocks remaining (if any exist) in the source band as well as in the destination band or overflow regions assigned to the LBA range of the source band.

Following the read operation 1204, a write operation 1206 writes the data read from the valid blocks of the LBA range to a final destination band. The final destination band may, for example, be one of the destination bands already assigned to the LBA range or a newly-opened band assigned to the LBA range of the source band. The write operation 1206 writes the data to the final destination band according to LBA order, sequentially filling the band until all data of the LBA range is written. In effect, the read operation 1204 and write operation 1206 serve to consolidate all valid data of the LBA range of the source band to a single band once again.

An invalidation operation 1208 invalidates all prior versions of the data residing in the final destination band and a band release operation 1210 releases the source band and overflow region(s) no longer storing valid data so that these regions may be reused to support write operations of other, different LBA ranges.

The technology disclosed herein allows a disc drive to follow SMR writing rules for newly written data as the data is always written sequentially forward in a band. While the above examples have only two streams per band, the solution can work for multiple streams per band. A potential drawback of the solution is the fragmentation that is introduced for the read operation. However, the performance impact of the fragmentation is limited because the reads are expected to come in similar packets as the corresponding writes. With large reads (1-4 MB) the effect of fragmentation is small and the disc drive can achieve throughput close to that on a conventional drive. Furthermore, because the data is organized by bands the associated data of large streaming reads will be in close proximity. Finally, caching schemes can be used to read up the associated data in the band and thus minimize the seeks.

Implementation of the technology disclosed herein may require that a certain number of bands are maintained in a free pool that can be used for servicing the active streams. For example, in one implementation, during the band filling or active state, each logical band requires two physical bands. A 2 TB drive with 256 MB bands will have around 8000 bands. Assuming approximately 4% allocation for the open bands' the drive can support approximately 320 active streams. Workload analysis for some video streaming workloads indicates that this number of stream is generally sufficient. In typical client applications the number of active video streams is even lesser. In the cloud (Hadoop) workloads the working set (number of active bands) is usually less than 3% of the drive capacity. Thus the disclosed technology can support the streaming requirements for most practical video streaming and some cloud applications with a reasonable amount of over-provisioning. Similarly, the metadata requirements in the storage device to track the resulting stream fragments is small compared to a typical storage drive capacity.

Although the block diagrams and flowcharts disclosed herein describe various embodiments in the context of storage devices for purposes of illustration and explanation, it is to be understood that the technology disclosed herein can be more broadly used for any type of servo control loop that can be subject to vibration.

In one implementation, the block diagrams and flowcharts disclosed above are implemented in hardware and/or in software (including firmware, resident software, microcode, etc.). Furthermore, various implementations may take the form of a computer program product on a computer-usable or computer-readable storage medium having computer-usable or computer-readable program code embodied in the medium for use by or in connection with an instruction execution system. Accordingly, as used herein, the term "circuit" may take the form of digital circuitry, such as processor circuitry (e.g., general-purpose microprocessor and/or digital signal processor) that executes program code, and/or analog circuitry.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   determining that a sequence of incoming write commands are associated with an LBA range mapped to a source band;
   reserving a destination band exclusively for storage of data associated with the LBA range mapped to the source band;
   dynamically mapping and writing data of the incoming write commands to physical blocks of the destination band, the data of the incoming write commands being dynamically mapped and written according to a sequential order of data receipt and in a forward write direction to sequentially fill physically-consecutive blocks in the destination band;
   determining that one of the incoming write commands includes updated data corresponding to data already written to the destination band; and
   writing the updated data to a consecutive sequence of physical blocks in the destination band, the consecutive sequence beginning with a first unused physical block in the forward write direction of the destination band.

2. The method of claim 1, further comprising:
   marking as stale data blocks of the destination band previously mapped to an LBA range of the write update.

3. The method of claim 1, further comprising:
   determining that the destination band does not include enough unused physical blocks to receive data of a received write request of the incoming sequence; and
   writing the data of the write request to an overflow region.

4. The method of claim 3, wherein the overflow region is a write cache.

5. The method of claim 4, wherein the write cache includes unshingled data tracks and the destination band includes shingled or interlaced data tracks.

6. The method of claim 3, wherein the overflow region is a secondary destination band and the method further comprises;
   assigning the secondary destination band to the LBA range assigned to the source band and the destination band; and
   writing the data of the received write request to a consecutive sequence of physical blocks in the secondary destination band, the consecutive sequence beginning with a first unused physical block in the forward write direction of the secondary destination band.

7. The method of claim 6, further comprising:
   receiving an additional write request associated with the LBA range after the secondary destination band has been assigned to the LBA range; and
   writing data of the additional write request to a consecutive sequence of physical blocks in the secondary destination band, the consecutive sequence beginning with a first unused physical block in the forward write direction of the secondary destination band.

8. The method of claim 1, further comprising:
   determining that a band closing condition is satisfied;
   reading all valid data of the LBA range into memory; and
   writing the read data to a final destination band according to a sequential LBA order and a sequential fill order.

9. A system comprising:
   memory; and
   a storage controller configured to:
   determine that a sequence of incoming write commands are associated with an LBA range mapped to a source band;
   reserve a destination band exclusively for storage of data associated with the LBA range mapped to the source band;
   dynamically map and write data of the incoming write commands to physical blocks of the destination band, the data of the incoming write commands being dynamically mapped and written according to a sequential order of data receipt and in a forward write direction to sequentially fill physically-consecutive blocks in the destination band;
   determine that one of the incoming write commands includes updated data corresponding to data already written to the destination band; and
   write the updated data to a consecutive sequence of physical blocks in the destination band, the consecutive sequence beginning with a first unused physical block in the forward write direction of the destination band.

10. The system of claim 9, wherein the storage controller is further configured to:
    mark as stale data blocks of the destination band previously mapped to an LBA range of the write update.

11. The system of claim 9, wherein the storage controller is further configured to:
    determine that the destination band does not include enough unused physical blocks to receive data of a received write request of the incoming sequence; and
    write the data of the write request to an overflow region.

12. The system of claim 11, wherein the overflow region is a write cache.

13. The system of claim 12, wherein the write cache includes unshingled data tracks and the destination band includes shingled data tracks.

14. The system of claim 11, wherein the overflow region is a secondary destination band and the storage controller is further configured to:
    assign the secondary destination band to the LBA range assigned to the source band and the destination band; and
    write the data of the received write request to a consecutive sequence of physical blocks in the secondary destination band, the consecutive sequence beginning with a first unused physical block in the forward write direction of the secondary destination band.

15. The system claim 14, wherein the storage controller is further configured to:
    receive an additional write request associated with the LBA range after the secondary destination band has been assigned to the LBA range; and
    write data of the additional write request to a consecutive sequence of physical blocks in the secondary destination band, the consecutive sequence beginning with a first unused physical block in the forward write direction of the secondary destination band.

16. The system of claim 9, wherein the storage controller is further configured to:
    determine that a band closing condition is satisfied;
    read all valid data of the LBA range into memory; and write the read data to a final destination band according to a sequential LBA order and a sequential fill order.

17. One or more memory devices encoding computer-executable instructions for executing on a computer a computer process comprising:
  determining that a sequence of incoming write commands are associated with an LBA range mapped to a source band;
  reserving a destination band exclusively for storage of data associated with the LBA range mapped to the source band;
  dynamically mapping and writing data of the incoming write commands to physical blocks of the destination band, the data of the incoming write commands being dynamically mapped and written according to a sequential order of data receipt and in a forward write direction to sequentially fill physically-consecutive blocks in the destination band;
  determining that one of the incoming write commands includes updated data corresponding to data already written to the destination band; and
  writing the updated data to a consecutive sequence of physical blocks in the destination band, the consecutive sequence beginning with a first unused physical block in the forward write direction of the destination band.

18. The one or more memory devices of claim 17, wherein the computer process further comprises:
  determining that the destination band does not include enough unused physical blocks to receive data of a received write request of the incoming sequence; and
  writing the data of the write request to an overflow region.

19. The one or more memory devices of claim 18, wherein the overflow region is a write cache.

20. The one or more memory devices of claim 19, wherein the write cache includes unshingled data tracks and the destination band includes shingled or interlaced data tracks.

* * * * *